(12) United States Patent
Klatt

(10) Patent No.: US 7,591,175 B2
(45) Date of Patent: *Sep. 22, 2009

(54) MAGNETIC SEPARATION IN FLUIDS

(76) Inventor: Darrell Clarry Klatt, Box 355, Caroline, AB (CA) T0M 0M0

( * ) Notice: Subject to any disclaimer, the term of this patent is extended or adjusted under 35 U.S.C. 154(b) by 0 days.

This patent is subject to a terminal disclaimer.

(21) Appl. No.: 12/040,566

(22) Filed: Feb. 29, 2008

(65) Prior Publication Data

US 2008/0142211 A1  Jun. 19, 2008

Related U.S. Application Data

(63) Continuation of application No. 11/555,910, filed on Nov. 2, 2006, now Pat. No. 7,350,409.

(60) Provisional application No. 60/596,983, filed on Nov. 2, 2005.

(51) Int. Cl.
*E21B 47/10* (2006.01)
*B01D 35/06* (2006.01)
*G01N 30/00* (2006.01)

(52) U.S. Cl. .................... 73/152.18; 73/61.72; 210/695

(58) Field of Classification Search ............... 73/152.18, 73/61.72; 210/222, 695; 324/204
See application file for complete search history.

(56) References Cited

U.S. PATENT DOCUMENTS

| | | | |
|---|---|---|---|
| 1,473,606 A | 11/1923 | Brandon |
| 2,732,243 A | 1/1956 | Mount |
| 2,792,115 A | 5/1957 | Medearis |
| 3,089,724 A | 5/1963 | Crooks |
| 3,377,641 A | 4/1968 | McGregor |
| 3,682,256 A | 8/1972 | Stuart |
| 4,030,558 A | 6/1977 | Morris |
| 5,217,610 A | 6/1993 | McClain et al. |
| 5,367,278 A | 11/1994 | Yoshikawa |
| 5,395,148 A | 3/1995 | Jameson et al. |
| 5,466,574 A | 11/1995 | Liberti et al. |
| 5,791,492 A | 8/1998 | Reali et al. |
| 5,880,661 A | 3/1999 | Davidson et al. |
| 5,944,195 A | 8/1999 | Huang et al. |
| 6,400,247 B1 | 6/2002 | King |
| 6,453,738 B1 | 9/2002 | Cesmat et al. |
| 6,706,178 B2 | 3/2004 | Simonson |
| 2005/0045542 A1 | 3/2005 | Hobson |

*Primary Examiner*—John Fitzgerald
(74) *Attorney, Agent, or Firm*—Bennett Jones LLP

(57) ABSTRACT

Methods and apparatus are disclosed for recovering magnetically attractable wellbore casing fragments from drilling fluid used in hydrocarbon-producing formations.

21 Claims, 4 Drawing Sheets

MAGNETIC SEPARATION IN FLUIDS

CROSS REFERENCE TO RELATED APPLICATIONS

The present application is a continuation of U.S. patent application Ser. No. 11/555,910, filed Nov. 2, 2006, now U.S. Pat. No. 7,350,409, issued Apr. 1, 2008. This application and the parent application Ser. No. 11/555,910 both claim priority to U.S. provisional patent application No. 60/596,983, filed Nov. 2, 2005.

FIELD OF THE INVENTION

The present invention relates to an apparatus and methods for recovering magnetically attractable articles from fluid, and more particularly to an apparatus and methods for recovering magnetically attractable fragments from fluid that has passed through oil and gas well casings to determine the metal loss from the well casings.

BACKGROUND OF THE INVENTION

Casings used to line wells in oil- and gas-producing formations typically suffer damage from erosion, perforation (such as for the purpose of running additional lines into such a formation), and ordinary wear and tear from the operation of the wells. Since the integrity of well casing is important to the integrity of the well, monitoring the condition of well casing is an important part of well maintenance. Drilling fluid is circulated in well casing for purposes including removing drill cuttings from the casing and from the face of the bit, so one way to monitor the condition of the casing is to collect and analyze the casing fragments released into the drilling fluid. The quantity of casing fragments collected from the drilling fluid is indicative of the quantity of fragments being generated down hole.

Solids and cuttings are generally removed from drilling fluids at the surface by solids control equipment such as shale shakers and hydrocyclones, which dump solids into collection bins. It is known to place a "ditch magnet" into the drilling fluid system to collect casing fragments from the drilling fluids. The shale shaker is a device in an oil well drilling process used to collect oversize drill cuttings, etc. from drilling fluid. The shale shaker is monitored for metal filings to assess metal wear such as for example, casing wear. For monitoring the metal wear, a shale shaker magnet is often used to magnetically attract and collect thereon at least a portion of metal filings that enter the shale shaker. The magnets are periodically removed from the shale shaker and the metal filings collected therefrom and weighed in order to quantify the filings that have been collected in the time period. The quantity of filings that are collected are indicative of the amount of metal filings passing into the shale shaker and, therefore, also indicative of the amount of metal filings being generated down hole.

The typical ditch magnet is heavy, and requires at least two persons to lower it into the drilling fluid stream. As metal fragments adhere to the ditch magnet, the device becomes even heavier and difficult for personnel to remove. Removal of the metal particles from the ditch magnet is difficult because of the strong magnetic field, which can also result in the magnetization of handles or other features of the device. Drilling personnel usually run their hands over the surface of the ditch magnet in an effort to strip the magnetic materials from the magnet. In prior art devices, the handle often complicates the collection of the magnetic materials attracted about it. The collection process becomes slow and laborious, and the completeness of the collection process can vary from person to person and from time to time because of the added complexity of removing the collected materials about the handle. Thus, the amount of metal fragments retrieved and therefore the accuracy of the calculation of total metal loss in the casing depends on the skill and thoroughness of the personnel removing the fragments from the ditch magnets.

Another known method of fragment removal employs shrouded or sheathed magnets in a non-magnetic housing which includes a lid connectable to the housing so that the magnets are removable from the housing. By removing the magnets from the housing, the housing can be demagnetized to facilitate collection of the metal filings from the exterior surface of the housing. However, the connection between the lid and the housing can become fouled by drilling mud and metal filings so that the reconnection of the lid to the housing becomes difficult. There is a need for an apparatus and method for inexpensive removal of casing fragments from drilling fluids without the disadvantages of the known devices and methods.

SUMMARY OF THE INVENTION

The present invention is directed to methods and apparatus for removing casing fragments from fluids circulated in hydrocarbon-producing wells.

In one aspect, the invention is directed to a method for monitoring the condition of well casing by recovering magnetically attractable casing fragments from fluid in a vessel having an upper end, including placing a reusable magnetic separator in the fluid in the vessel, wherein the separator includes a magnetic body, at least one nonmagnetic end contiguous to the body, an exterior surface spanning the body and nonmagnetic end, and a hanger; retaining the separator in the fluid for a selected period of time; removing the separator from the vessel; and urging the casing fragments along the exterior surface of the separator to the nonmagnetic end and collecting them. In another aspect, the invention is directed to a magnetic separator, having a bare magnet body, at least one nonmagnetic end contiguous to the body, and an exterior surface spanning the body and nonmagnetic end.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1A:
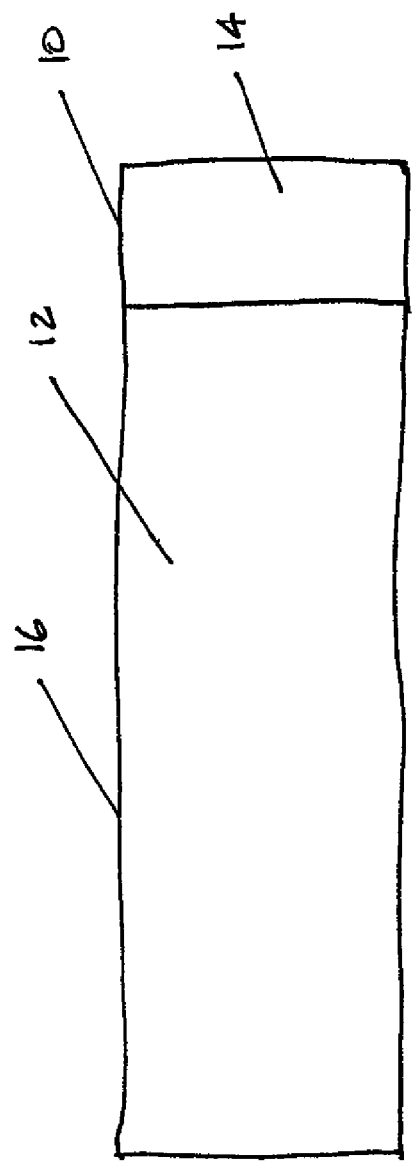
FIG. 1A is a side elevation of an embodiment of an apparatus according to the present invention.

Referring to FIG. 1A, one apparatus according to the invention is a reusable magnetic separator 10 for retrieving metal fragments from hydrocarbon well fluids including a magnet body 12 contiguous to at least one nonmagnetic end 14, and an exterior surface 16.

In some embodiments of the invention, the separator may include more than one nonmagnetic end. In other embodiment, the separator may be connectable to one or more hangers, for suspension thereof in use. The hanger may include a cable, a rope, a chain, or other conventional materials. Where more than one hanger is used, the points of connection of the hanger may be spaced apart and furthermore the points of connection of the hangers may each be disposed at a nonmagnetic end.

Figure 1B:
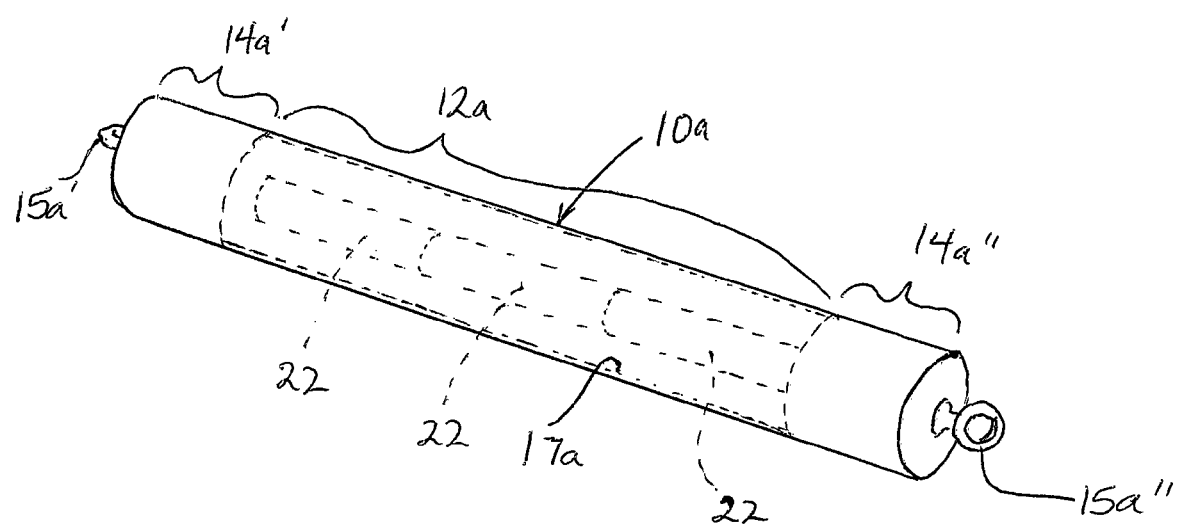
FIG. 1B is a perspective view of another embodiment of an apparatus according to the disclosed invention.

Referring to FIG. 1B, another reusable magnetic separator 10a is shown. Reusable magnetic separator 10a is formed as an elongate member including a magnetically attractant body 12a, a first nonmagnetic end 14a' and an opposite nonmagnetic end 14a". A first connector 15a' is positioned at first nonmagnetic end 14a' for accepting connection of a hanger (not shown) and a second connector 15a" is positioned at the opposite nonmagnetic end for connection of a second hanger (not shown). The first and the second connectors may be in the form of eyebolts, as shown. Body 12a and ends 14a' and 14a" are contiguous and formed by a housing 17a that extends about the separator. Housing 17a contains therein one or more magnetic sources, illustrated herein as bar magnets 22a, forming the magnetic body 12a. The magnets 22a do not extend into the housing at its ends forming nonmagnetic ends 14a', 14a". Housing 17a may have a surface that is substantially smooth and substantially free of protrusions along its sides.

Figure 2:
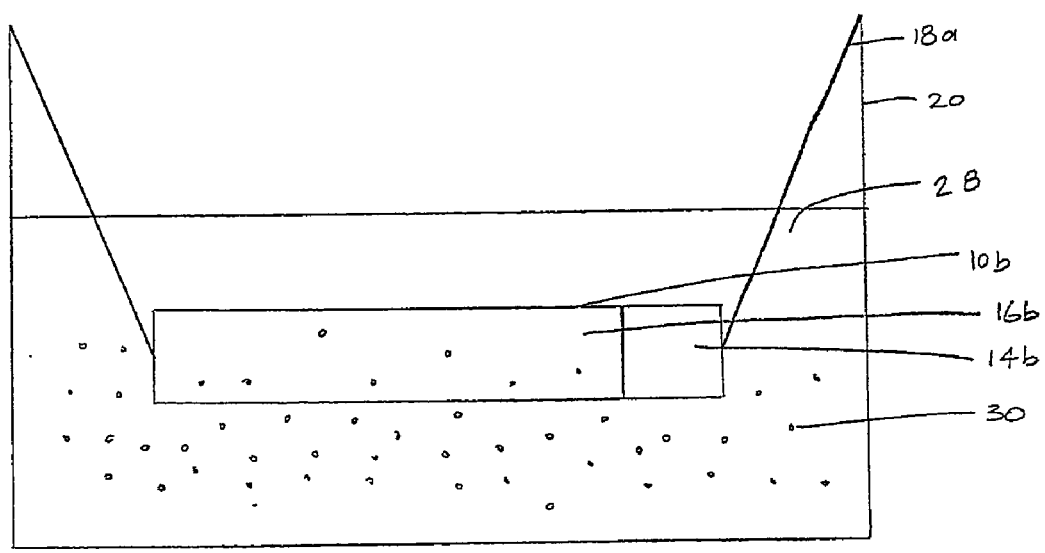
FIG. 2 is a schematic view of a device and a method according to the disclosed invention.

Referring to FIG. 2, a method of the invention includes placing a reusable magnetic separator 10b into fluid 28 in a vessel 20, such as a shale shaker, and retaining the separator 10b in the fluid 28 for a selected period of time; the magnetic field separates and magnetically collects the casing fragments 30 and other magnetically attractable materials from the fluid 28. After a suitable selected period of time, the separator 10b is removed from the vessel 20 and the collected materials are collected from the separator. To release the casing fragments 30 from the separator 10b, the casing fragments 30 are urged along the exterior surface 16b to the nonmagnetic end 14b, when they are no longer attracted to, and will fall away from, the separator. If the separator includes more than one nonmagnetic end, the magnetically attractable casing fragments may be collected by urging them to either or both nonmagnetic ends. The recovered casing fragments 30 may be analyzed (qualitatively and/or quantitatively) to assess the condition of the well casing.

As shown in FIG. 2, in some embodiments, the separator 10b may be suspended in the fluid 28 with one or more hangers 18a. In various embodiments of the invention, the length of the hanger or hangers may be selected to maintain the separator above the bottom of the vessel. Since a shale shaker may accumulate settled materials, suspending the separator may facilitate collection of materials thereon as the separator is held up out of the accumulated materials and open in the flow of the fluid moving therepast. The selected length of the hanger may be fixed in some embodiments of the inventive methods so that when the separator is removed and repositioned within the vessel, it is suspended at the same position within the vessel each time.

Another aspect of the invention is a method for monitoring the condition of well casing by recovering magnetically attractable casing fragments from drilling fluid returning from the well, wherein the casing fragments may be generated by use or modification of the well casing. In this method, a reusable magnetic separator having a magnetic body and a nonmagnetic end contiguous to the body is placed in drilling fluid contained in a vessel, such as a shale shaker, whereby magnetically attractable casing fragments are separated from the fluid by the magnetic field created by the magnetic body. After a suitable selected period of time, the separator is removed from the fluid, and the casing fragments are urged along the exterior surface of the separator to the nonmagnetic end where they can be removed easily. The magnetic separator used in some embodiments may include a housing substantially free of protrusions along its sides and containing bar magnets, at least one nonmagnetic end, an eye bolt on the at least one nonmagnetic end attaching such nonmagnetic end to a hanger (such as a chain or other hanger type). In some embodiments, the collected casing fragments may be weighed after each of a number of similar time periods such that the amounts collected per time period may be compared over time. In another embodiment, weight of the recovered casing fragments may calculated and compared to a total weight of the casing originally installed in the well, which may be known or calculated, so that the percent of metal lost from the casing is obtainable for example by dividing the weight of the casing fragments recovered from the well by the total weight of the casing originally installed in the well. The casing fragments may also be subjected to qualitative assessment, such as by visual inspection.

Yet another aspect of the invention is a method for collecting magnetically attractable particles from fluid including placing a reusable magnetic separator in fluid, wherein the separator includes a magnetic body which in turn may have bare magnet, at least one nonmagnetic end contiguous to the body, and an exterior surface spanning the body and the nonmagnetic end; retaining the separator in the fluid for a selected period of time; removing the separator from the fluid; and, urging the particles along the exterior surface of the separator to the nonmagnetic end and collecting them.

Figure 3:
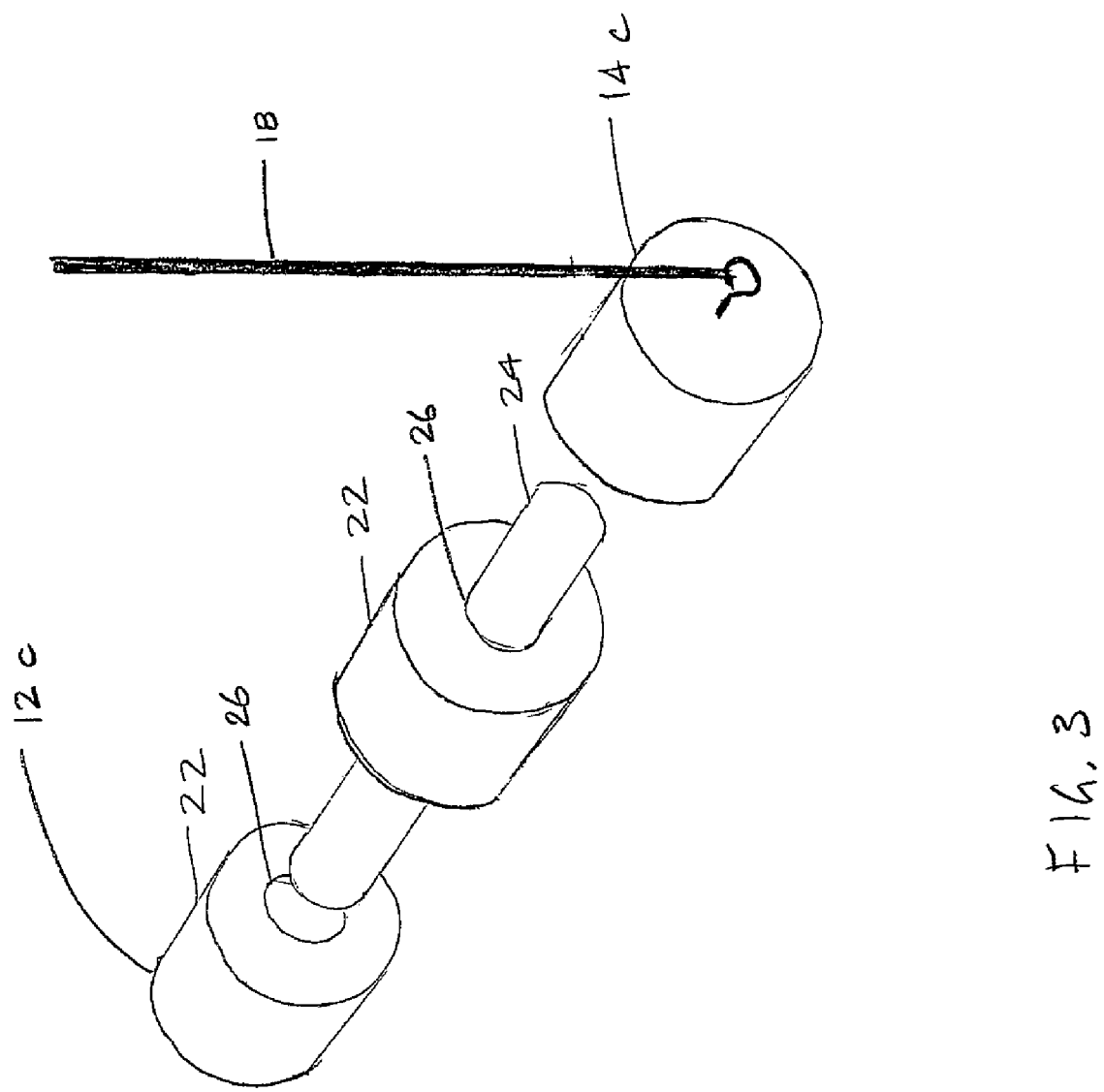
FIG. 3 shows an exploded isometric view of an embodiment the disclosed invention.

Referring to FIG. 3, in some embodiments of the invention the body 12c may include at least one magnet 22, and each magnet 22 may have a bore 26 such that the bores 26 of adjacent magnets 22 are aligned along an axis and a retainer 24 can be inserted through the bore 26 of each magnet 22. At least one end of the retainer 24 may be attached to a nonmagnetic end 14c, which nonmagnetic end is further attached by a connector to a hanger 18.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope as defined in the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for monitoring well casing comprising:
   (a) providing a vessel having drilling fluid circulating therethrough, the drilling fluid entering the vessel including that returning from a well;
   (b) placing a magnetic separator in the drilling fluid in the vessel, the magnetic separator comprising a magnetic body and an exterior surface and placing includes connecting the separator to at least one hanger and suspending the separator within the vessel using the at least one hanger;
   (c) retaining the magnetic separator in the drilling fluid for a first selected period of time such that fragments from the drilling fluid become magnetically attached to the magnetic separator;
   (d) removing the magnetic separator from the vessel and removing the fragments from the exterior surface;
   (e) replacing the magnetic separator in the drilling fluid in the vessel;
   (f) retaining the magnetic separator in the drilling fluid for a second selected period of time having a duration similar to the first selected period of time such that a second amount of fragments from the drilling fluid become magnetically attached to the magnetic separator;
   (g) removing the magnetic separator from the vessel and removing the second amount of fragments from the exterior surface; and
   (h) comparing the fragments with the second amount of fragments to assess the well casing comparatively between the first period of time and the second period of time.

2. The method of claim 1, wherein comparing includes weighing the fragments and weighing the second amount of fragments and comparing their weights.

3. The method of claim 1, wherein during placing, the magnetic separator is positioned in a position within the vessel and during replacing, the magnetic separator is positioned in substantially the same position within the vessel.

4. The method of claim 1, wherein suspending the magnetic separator includes suspending the magnetic separator in the vessel spaced above a bottom of the vessel.

5. The method of claim 1, wherein the at least one hanger is connected to an upper end of the vessel by the at least one hanger.

6. The method of claim 1, further comprising fixing the length of the at least one hanger.

7. The method of claim 1, wherein the vessel is a shale shaker.

8. The method of claim 1, further comprising analyzing the fragments after removing them.

9. The method of claim 1, further comprising selecting the length of the at least one hanger to suspend the separator away from a bottom of the vessel.

10. The method of claim 9, further comprising fixing the length of the hanger.

11. A method for monitoring well casing comprising:
    (a) providing a vessel having drilling fluid circulating therethrough, the drilling fluid entering the vessel including that returning from a well;
    (b) providing a magnetic separator including a magnetic body and an exterior surface;
    (c) providing at least one hanger connected to the magnetic separator;
    (d) placing the magnetic separator in the drilling fluid in the vessel, including connecting the at least one hanger to a support and hanging the magnetic separator on the at least one hanger to place the magnetic separator within the vessel;
    (e) retaining the magnetic separator in the drilling fluid for a period of time such that fragments from the drilling fluid become magnetically attached to the magnetic separator;
    (f) removing the magnetic separator from the vessel;
    (g) collecting magnetically attracted fragments from the magnetic separator; and
    (h) analyzing the magnetically attracted fragments to assess casing condition.

12. The method of claim 11, wherein hanging the magnetic separator includes suspending the magnetic separator in the vessel spaced above a bottom of the vessel.

13. The method of claim 11, wherein the support is an upper end of the vessel.

14. The method of claim 11, further comprising fixing the length of the at least one hanger and, after urging, replacing the magnetic separator hung in the drilling fluid within the vessel, such that replacing the magnetic separator positions the magnetic separator at a similar location within the vessel each time it is replaced.

15. The method of claim 11, further comprising selecting the length of the at least one hanger to suspend the separator away from a bottom of the vessel.

16. The method of claim 15, further comprising fixing the length of the at least one hanger.

17. The method of claim 11 wherein the at least one hanger includes any of a rope, a cable or a chain.

18. The method of claim 11 wherein there are at least two hangers and hanging includes suspending the magnetic separator between the two hangers.

19. The method of claim 11 wherein the magnetic separator includes a non-magnetic end and the at least one hanger is connected to the non-magnetic end.

20. The method of claim 11, wherein the vessel is a shale shaker.

21. A method for monitoring well casing comprising:
    (a) providing a vessel having drilling fluid circulating therethrough, the drilling fluid entering the vessel including that returning from a well;
    (b) placing a magnetic separator in the drilling fluid in the vessel, the magnetic separator comprising a magnetic body and an exterior surface and placing includes suspending the magnetic separator in the vessel spaced above a bottom of the vessel;
    (c) retaining the magnetic separator in the drilling fluid for a first selected period of time such that fragments from the drilling fluid become magnetically attached to the magnetic separator;

(d) removing the magnetic separator from the vessel and removing the fragments from the exterior surface;
(e) replacing the magnetic separator in the drilling fluid in the vessel;
(f) retaining the magnetic separator in the drilling fluid for a second selected period of time having a duration similar to the first selected period of time such that a second amount of fragments from the drilling fluid become magnetically attached to the magnetic separator;
(g) removing the magnetic separator from the vessel and removing the second amount of fragments from the exterior surface; and
(h) comparing the fragments with the second amount of fragments to assess the well casing comparatively between the first period of time and the second period of time.

\* \* \* \* \*